United States Patent [19]
Abe et al.

[11] Patent Number: 5,399,841
[45] Date of Patent: Mar. 21, 1995

[54] HONEYCOMB HEATER

[75] Inventors: Fumio Abe, Handa; Tomoharu Kondo, Toki; Kenichi Tanaka, Chita, all of Japan

[73] Assignee: NGK Insulators, Ltd., Japan

[21] Appl. No.: 102,802

[22] Filed: Aug. 6, 1993

[30] Foreign Application Priority Data

Aug. 18, 1992 [JP] Japan .................. 4-219245

[51] Int. Cl.⁶ .............. H05B 3/10; F01N 3/10; B01D 53/36
[52] U.S. Cl. ............... 219/552; 60/300; 422/174
[58] Field of Search .............. 219/552, 553, 541, 542; 392/502, 347, 379, 485, 486, 488, 490; 60/299, 295, 300, 302; 422/174, 175, 177, 179, 180

[56] References Cited

U.S. PATENT DOCUMENTS

| | | | |
|---|---|---|---|
| 4,740,408 | 4/1988 | Mochida et al. | 422/179 |
| 5,063,029 | 11/1991 | Mizuno et al. | 422/175 |
| 5,194,229 | 3/1993 | Abe et al. | 422/174 |
| 5,200,154 | 4/1993 | Harada et al. | 60/300 |
| 5,202,547 | 4/1993 | Abe et al. | 60/300 |
| 5,229,079 | 7/1993 | Harada et al. | 422/174 |
| 5,229,080 | 7/1993 | Abe et al. | 422/177 |
| 5,245,825 | 9/1993 | Ohhashi et al. | 60/300 |
| 5,266,278 | 11/1993 | Harada et al. | 60/300 |

FOREIGN PATENT DOCUMENTS 465183  1/1992  European Pat. Off. .......... 60/300

Primary Examiner—Geoffrey S. Evans
Attorney, Agent, or Firm—Parkhurst, Wendel & Rossi

[57] ABSTRACT

A heating element for heating fluid flowing therethrough includes: a honeycomb structure having a periphery and two ends, including a plurality of passages which are defined by partition walls and extend in an axial direction between the ends, the honeycomb structure being composed of an electrically conductive material; and a pair of electrodes for applying electric current to the honeycomb structure so as to generate heat; wherein a maximum length of linear portions of the partition walls is up to 10 mm as viewed in a cross-section of the honeycomb structure taken perpendicular to the axial direction, and a number of the passages in one square inch ranges from 50 to 800 as viewed in the cross-section of the honeycomb structure, thereby insuring improved thermal shock resistance and purification efficiency. The partition walls are less prone to deformation and crack formation due to thermal stress.

12 Claims, 4 Drawing Sheets

HONEYCOMB HEATER

BACKGROUND OF THE INVENTION

1. Field of the Invention

The present invention relates to a honeycomb heater, which can be used as a preheater for control of automobile exhaust emissions.

2. Description of the Related Art

Conventionally, porous ceramic honeycomb structures have been employed as carriers for catalysts for removing, for example, nitrogen oxides, carbon monoxide and hydrocarbons present in the exhaust gas of internal combustion engines of automobiles. Recently, a honeycomb structure composed of a metallic material has drawn attention since the metallic honeycomb structure has high mechanical strength and heat resistance. The metallic honeycomb structure may be made by firing a green compact including metal powders.

As restriction of exhaust emission controls has been intensified, there has been a demand for development of heaters adapted to decrease pollutants during the initial running of the engine when the engine is not warmed up.

U.S. Pat. No. 5,063,029 discloses a resistance adjusting type heater including an electrically conductive honeycomb structure, at least two electrodes in electrical contact with the honeycomb structure, and means for adjusting electrical resistance, such as a slit, provided in the honeycomb structure hereby the heater can regulate its heat generation. The heater reduces pollutants during the initial running of the engine.

Sometimes a position of the heater installed in the exhaust system of an automobile may become important. When the heater is arranged below the floor of an automobile, the heater is not subject to severe conditions, and the heater does not develop any problems. However, when the heater is disposed at a position close to the engine, for example, in a manifold in the exhaust system, the heater is subject to severe conditions including high temperatures and frequent large temperature changes, and partition walls of the honeycomb structure thereof may sometimes deform or crack due to thermal stress thereby increasing electrical resistance.

Moreover, a honeycomb structure of the heater in U.S. Pat. No. 5,063,029 may have a wide range in a number of passages in one square inch from 6 to 500, and the honeycomb structure has room for improvement in improving thermal stress.

SUMMARY OF THE INVENTION

Accordingly, an object of the present invention is to provide a honeycomb heater which eliminates the aforementioned problems.

To achieve the above object, the present invention provides a heating element for heating fluid flowing therethrough, comprising: a honeycomb structure having a periphery and two ends, including a plurality of passages which are defined by partition walls and extend in an axial direction between the ends, the honeycomb structure being composed of an electrically conductive material; and means for applying electric current to the honeycomb structure so as to generate heat; wherein a maximum length of linear portions of the partition walls is up to 10 mm as viewed in a cross-section of the honeycomb structure taken perpendicular to the axial direction, and a number of the passages in one square inch ranges from 50 to 800 as viewed in the cross-section of the honeycomb structure. Limiting the maximum length of linear portions of the partition walls improves thermal shock resistance of the heating element so that the partition walls are less prone to deformation and crack formation due to thermal stress. The range in the passage density makes the heating element well balanced in terms of its purification performance of pollutants in exhaust gas, its heat generation, pressure loss of fluid passing therethrough. The word "linear" refers to a form of a substantially straight line.

The maximum length of linear portions of the partition walls may be up to 5 mm and preferably up to 3 mm, as viewed in the cross-section of the honeycomb structure so that the honeycomb structure further improves thermal shock resistance. Preferably the number of the passages in one square inch ranges from 50 to 500 as viewed in the cross-section of the honeycomb structure, and further preferably the number of the passages in one square inch ranges from 50 to 300 as viewed in the cross-section of the honeycomb structure.

A ratio of an area of one of the two ends in square centimeter to an average thickness of the honeycomb structure along the axial direction in centimeter ranges from 10 to 50 $cm^2$/cm, and preferably the ratio ranges from 10 to 30 $^2$/cm.

Preferably at least one slit is formed through the partition walls thereby regulating heat generation from the honeycomb structure. An arrangement of slits can make uniform heat generation or deliberately non-uniform heat generation, depending on its application.

The partition walls may have a thickness in the range of 40 to 250 $\mu$m so that the heating element has small heat capacity and sufficient mechanical strength. The thickness of the partition walls is preferably not more than 250 $\mu$m so that the honeycomb structure has small heat capacity, and the honeycomb structure can be quickly heated. On the other hand, the honeycomb structure with the partition walls having a thickness less than 40 $\mu$m may not have sufficient mechanical strength, and the honeycomb structure is not preferable.

Preferably the passages have a length ranging from 10 to 50 mm along the axial direction so that temperature variation along the axial direction becomes smaller, thereby decreasing thermal stress along the axial direction.

The honeycomb structure may be an integral body formed by sintering a shaped body comprising a powder material. The integral body of the honeycomb structure does not undergo a telescope phenomenon unlike the foil-type honeycomb structure, and ensures uniform heat generation. Moreover, the method for producing the integral body is reasonably simple with a low production cost. The method includes a step of forming a shaped body out of a powder material and sintering the shaped body.

Preferably the heating element may further comprise a catalyst composition formed on at least a part of the partition walls of the honeycomb structure, and the catalyst composition comprises a heat-resistant inorganic oxide and a catalytically active component loaded onto the inorganic oxide. The catalytically active component comprises an element selected from the group consisting of platinum, palladium, rhodium, and iridium.

The means for providing electric current may comprise two electrodes in electrical contact with the honeycomb structure.

Preferably gaps are formed through one of the partition walls so as to shorten the maximum length of linear portions of the partition walls. Gaps may be formed along the axial direction, but the direction of the gaps is not restricted.

In another embodiment of the present invention, a largest open distance of each of the passages has a length up to 10 mm as viewed in a cross-section of the honeycomb structure taken perpendicular to the axial direction.

BRIEF DESCRIPTION OF THE DRAWINGS

The invention is described in greater detail below, with reference to the enclosed drawings in which.

DETAILED DESCRIPTION OF THE INVENTION

In a honeycomb heater having a honeycomb structure and a pair of electrodes for applying electric current to the honeycomb structure, thermal stress generated in the honeycomb structure, mechanical strength to withstand vibration during driving an automobile, and purification performance to purify pollutants in an exhaust gas depend on factors such as shape of cells or passages defined by partition walls of the honeycomb structure, cell density of the honeycomb structure, thickness, length, and volume of the honeycomb structure, and catalyst composition formed on the partition walls. These factors are determined when honeycomb heater is designed. In addition, application of the honeycomb heater is considered, including the conditions to which the honeycomb heater is exposed.

In the heating element of the present invention, a maximum length of linear portions of partition walls is up to 10 mm as viewed in a transverse cross-section of the honeycomb structure.

Figure 4:
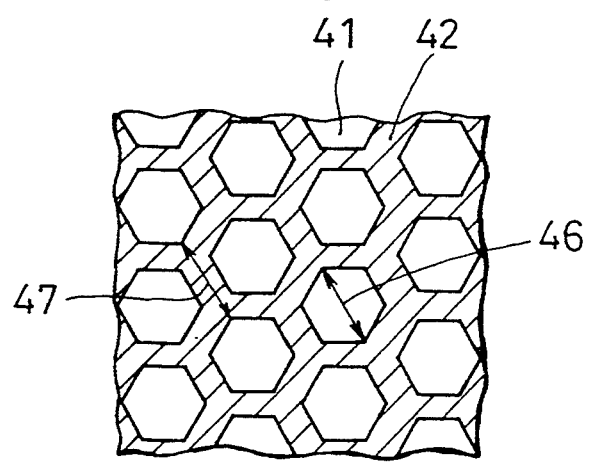
FIG. 4 shows an enlarged cross-sectional view of passages and partition walls of an embodiment of a honeycomb heater taken perpendicular to the axial direction of the honeycomb heater.

Examples of the shapes and patterns of passages and partition walls are shown in FIGS. 2, 4, 5, and 6. In FIGS. 2, 4, 5, and 6, passages 21, 41, 51, and 61 are defined by partition walls 22, 42, 52, and 62, and the passages extend in axial directions of the honeycomb structures which penetrate drawing sheets. In FIG. 4, the passages have a shape of hexagon, and a maximum length of linear portions of partition walls refers to an edge length 47 of a passage.

Figure 5:
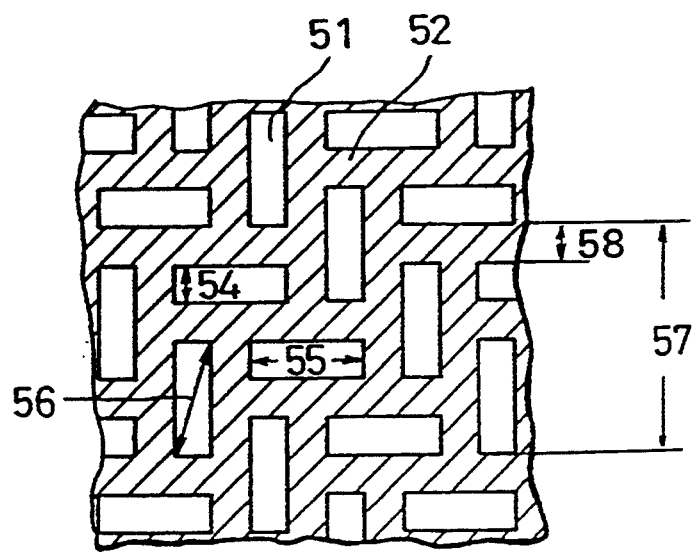
FIG. 5 shows an enlarged cross-sectional view of passages and partition walls of an embodiment of a honeycomb heater taken perpendicular to the axial direction of the honeycomb heater.

In FIG. 5, the passages have a shape of rectangle, and three adjacent passages are arranged so that a part of partition walls, which separate the three passages, has a T shape. In other words, three edges of partition walls for the three adjacent passages share the same corner, and a pair of opposing edges are arranged along a straight line at the corner, and another edge joins at the corner. A maximum length of linear portions of partition Walls in FIG. 5 refers to a length of reference number 57, which is approximately the sum of a short edge length 54, a long edge length 55 and three times partition wall thickness 58.

Figure 2:
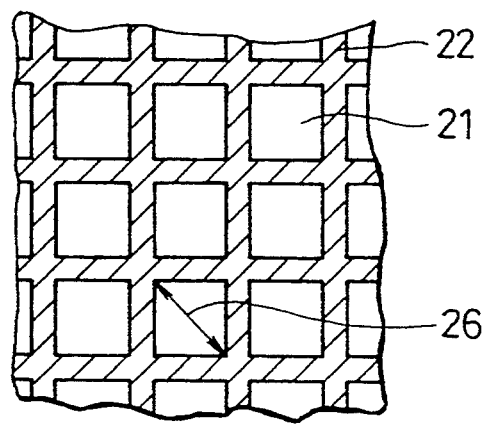
FIG. 2 shows an enlarged cross-sectional view of passages and partition walls of an embodiment of a honeycomb heater taken perpendicular to the axial direction of the honeycomb heater.

However, in FIG. 2, the passages have a shape of square, and four adjacent passages are arranged so that a part of partition walls which separate the four passages has a cross shape. In other words, edges of partition walls for the four adjacent passages share the same corner, and each of two pairs of opposing edges is arranged along a straight line at the corner. A linear portion of partition walls is not limited to an edge length of one passage or two passages but extends to a whole cross section perpendicular to the axial direction of the honeycomb structure, and a maximum length of linear portions of partition walls is the same as an effective diameter for passing fluid through the honeycomb structure.

Figure 1:
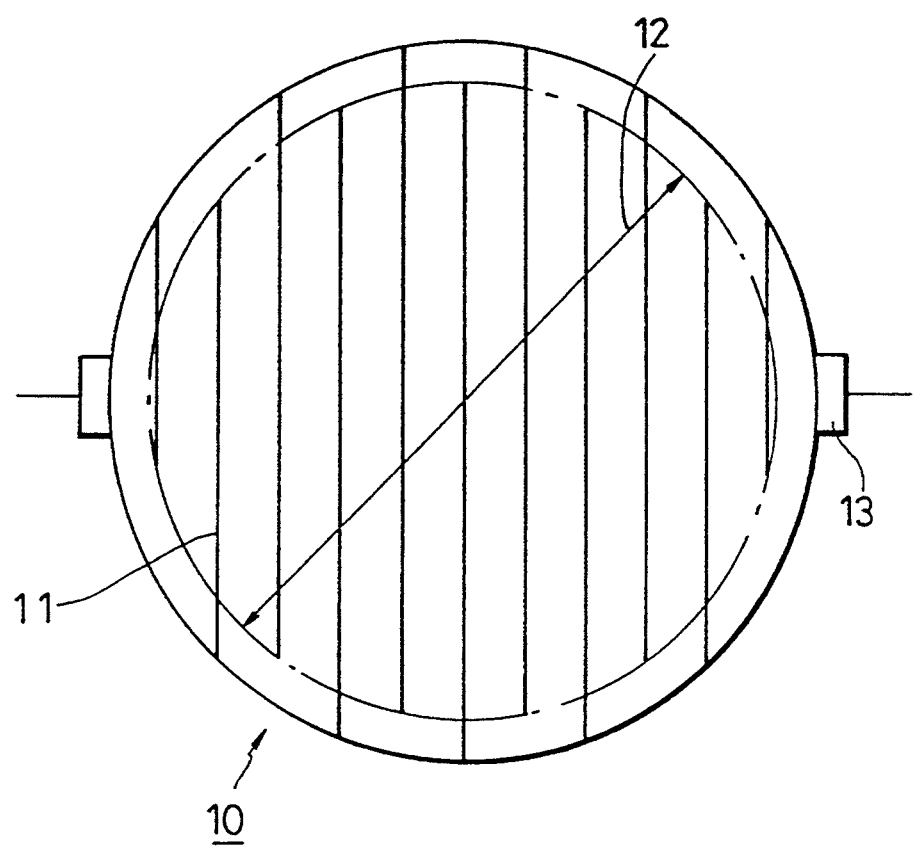
FIG. 1 shows a cross-sectional view of an embodiment of a honeycomb heater of the invention having a diameter for passing fluid therethrough of 82 mm.

FIG. 1 shows a cross-sectional view of an embodiment of a honeycomb heater, and the effective diameter for passing fluid of a honeycomb structure is indicated as reference numeral 12. The honeycomb structure 10 has a periphery and two ends, and a circumference of each of the two ends may be covered by a ring so that fluid may not pass circumferential portions 15 of the structure. The ring is disclosed in U.S. Pat. No. 5,202,548, and the ring may be used with a band covering the periphery.

The maximum length of linear portions of partition walls affects thermal shock resistance of the honeycomb structure, especially when the honeycomb heater is disposed in a manifold in the exhaust system in which the heater is subject to severe conditions. When the maximum length of linear portions or straight line of partition walls is larger than 10 mm, for example, when partition walls have the pattern of FIG. 2, the linear potion of partition walls in a transverse cross section extend as long as a diameter of the cross section, and thermal stress during temperature changes of the honeycomb structure affects the entire linear portion along the direction that the linear portion extends.

In contrast, in the present invention, the maximum length of linear portions of partition walls is limited so that the thermal stress is distributed to a plurality of small linear portions of partition walls so that partition walls are resilient to deform or crack due to thermal stress.

Figure 6:
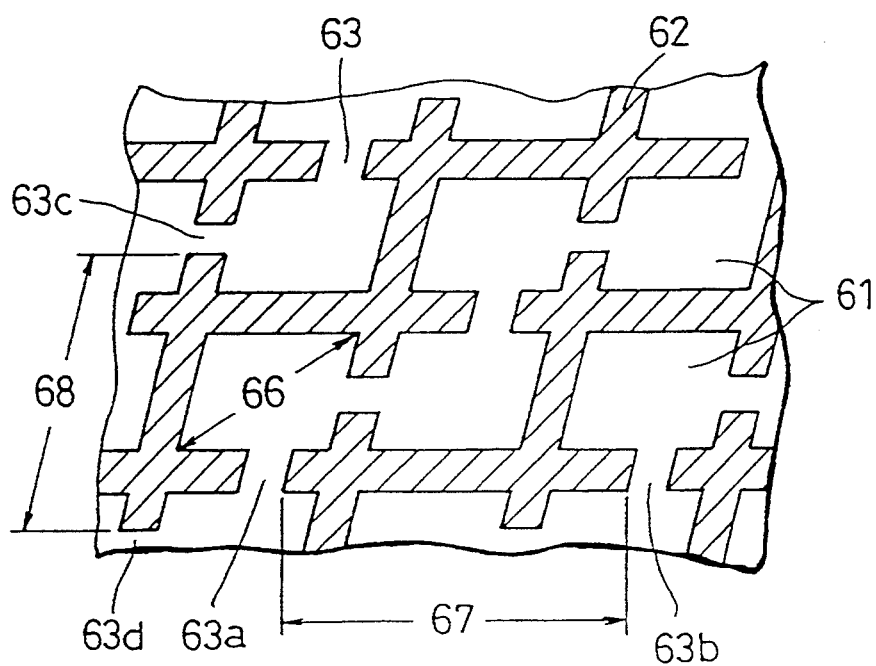
FIG. 6 shows an enlarged cross-sectional view of passages and partition walls of an embodiment of a honeycomb heater taken perpendicular to the axial direction of the honeycomb heater wherein gaps are formed through the partition walls.

In the present invention, gaps may be formed in partition walls so as to shorten the maximum length of linear portions of partition walls. In FIG. 6, gaps are formed in every other edge of partition walls in one direction, and a part of partition walls 67 defined by gaps 63a and 63b corresponds to the maximum length of linear portions of partition walls. Length 67 is longer than length 68 punctuated by gaps 63c and 63d.

A shape of passages or cells in the transverse cross section includes a circle, a polygon, and a corrugated shape. Partition walls in the transverse cross section are not necessarily limited linear. The partition walls may have a shape of, for example, an arc, a part of a sine curve, or other curved lines. When the partition walls in the transverse cross section have a shape of curved line, the maximum length of linear portions of partition walls becomes a small number which is much smaller than 10 mm.

In the honeycomb heater of the present invention, a number of the passages in one square inch ranges from 50 to 800 as viewed in a cross-section of the honeycomb structure taken perpendicular to the axial direction. When the number of the passages in one square inch is at least 50, the honeycomb structure has sufficient total surface areas of the partition walls to generate heat when electricity is applied to the honeycomb structure, and to load a catalyst composition onto surface of partition walls. The larger the cell density, the better the purification of pollutants when the catalyst composition is loaded onto the surface. When the honeycomb structure has up to 800 passages in one square inch in the transverse cross section, pressure loss of fluid passing through the passages is permissible.

Though a large cell density tends to worsen thermal shock resistance of the honeycomb structure, in the present invention, the maximum length of linear portions of partition walls of a cell in the transverse cross section is sufficiently small so as to have satisfactory thermal shock resistance. Thus, even when the honeycomb structure is arranged in a manifold in the exhaust system where the honeycomb structure is exposed to high temperatures and large temperature changes, the honeycomb structure does not largely increase its electrical resistance. Preferably the number of the passages in one square inch ranges from 50 to 500, and further preferably from 50 to 300 as viewed in the cross-section of tile honeycomb structure.

The partition walls may have a thickness in the range of 40 to 250 μm. The thickness of the partition walls affects heat capacity of the honeycomb heater. Therefore, when electric current is applied to the honeycomb heater to generate heat after the engine is turned on, a small thickness of the partition walls, which leads to small heat capacity of the honeycomb structure, is preferable so that temperature of the honeycomb structure rapidly increases. However, the partition walls having a thickness smaller than 40 μm are not preferable because the honeycomb structure may not have sufficient mechanical strength or thermal shock resistance. On the other hand, the partition walls thicker than 250 μm are not preferable because heat capacity of the honeycomb structure and the required electric powder are too large, and because pressure loss of fluid passing therethrough is not negligible.

Figure 7:
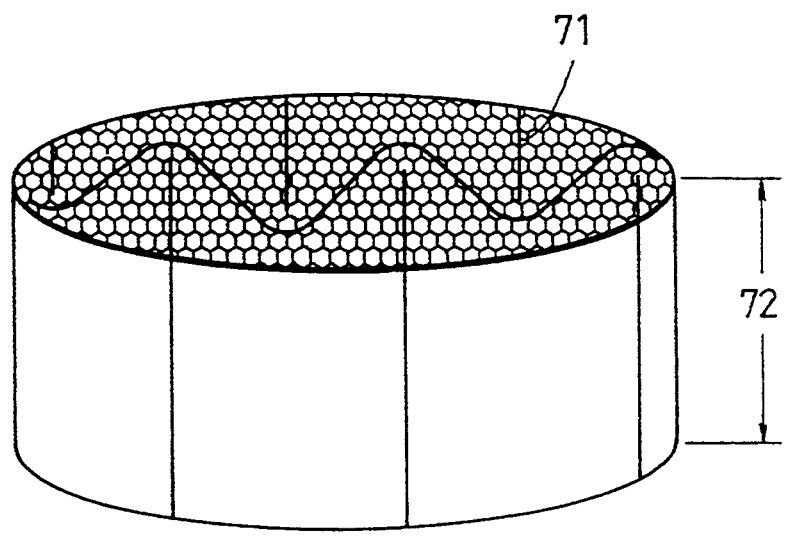
FIG. 7 shows a perspective view of a honeycomb structure for a honeycomb heater of the present invention.

Preferably the passages have a length ranging from 10 to 50 mm along the axial direction, or the honeycomb structure have a thickness ranging from 10 to 50 mm along the axial direction. In FIG. 7, the thickness of the honeycomb structure is shown by the reference numeral 72. The honeycomb structure has slits 71.

The length along the axial direction up to 50 mm decreases temperature variation and thermal stress along the axial direction. In other words when the length along the axial direction is larger than 50 mm, temperatures of the honeycomb structure along the axial direction largely much so as to increase thermal stress along the axial direction.

On the other hand, when the length along the axial direction is smaller than 10 mm, the honeycomb structure may have a transverse area perpendicular to the axial direction too large to have a honeycomb structure having a certain volume. The honeycomb structure with the large transverse area is not preferable: it is not easily installed in the exhaust system, and temperature may vary in radial directions of the honeycomb structure.

A ratio of an area in square centimeters of one of the two ends to an average length in centimeters of the honeycomb structure along the axial direction may range from 10 to 50 $cm^2/cm$, and preferably the ratio ranges from 10 to 30 $^2$/cm.

When the heating element of the present invention is used as a preheater in a stream of fluid, such as in the exhaust system, a catalyst element including a honeycomb structure having a plurality of passages defined by partition walls and a catalyst composition loaded onto partition walls may be disposed adjacent to the honeycomb heater in the flow direction of the stream of fluid. The heating element is upstream to the catalyst element. The catalyst element may be arranged to be close to the heating element, and the distance between the heating element and the catalyst element may be up to 5 cm along the stream. The honeycomb structure of the catalyst element may have a shape in a transverse cross section similar to the honeycomb structure of the heating element.

Any material, ceramic or metal, capable of generating heat when energized can be used as the material of the honeycomb structure. The use of metals is preferably because it enhances the mechanical strength of the honeycomb structure. Examples of such metals include stainless steel and those having compositions of Fe—Cr—Al, Fe—Cr, Fe—Al, Fe—Ni, W—Co, and Ni—Cr. Among the above materials, Fe—Cr—Al, Fe—Cr, and Fe—Al are preferred because of their low cost and their high resistance to heat, oxidation, and corrosion. These alloys may include a small amount of boron, silicon, zirconium, molybdenum, tungsten, and rare earth oxide such as $Y_2O_3$. A composition of a honeycomb structure may be those disclosed in the U.S. patent application Ser. No. 07/767,889. Alternatively, a honeycomb structure of a foil type may be employed.

The honeycomb structure used in the present invention may or may not be porous. When a catalyst composition is carried on the honeycomb structure, however, a porous honeycomb structure is preferred thereby ensuring close adherence of the catalyst composition to partition walls of the honeycomb structure. Moreover, the catalyst composition formed on the porous honeycomb structure is less prone to peeling off due to a difference in thermal expansion between the porous honeycomb structure and the catalyst composition.

The method of manufacturing the metal honeycomb structure which can be employed in the present invention is described.

First, iron powders, aluminum powders, chromium powders, and/or powders of alloys of these metals, are mixed to prepare a mixture having a desired composition. Subsequently, the mixture is blended into an organic binder, such as methyl cellulose or poly(vinylalcohol), and water to produce a readily formable mixture, and the resultant formable mixture is then formed into a shape of a desired honeycomb configuration through an extrusion die.

When the metal powder mixture is blended into an organic binder and water, prior to the addition of water, an antioxidant, such as oleic acid, may be added to the metal powder mixture. Alternatively, powders of metals which are subjected to an antioxidation process may be employed.

Next, the formed honeycomb body is fired in a non-oxidizing atmosphere at a temperature ranging from 1000° C. and 1400° C. The atmosphere during the sintering preferably includes hydrogen so that the organic binder is decomposed and removed with iron acting as a catalyst.

Sintering at a temperature lower than 1000° C. achieves no sintering. Sintering at a temperature higher than 1450° C. causes deformation of the resulting sintered body.

Preferably, a heat-resistant metal oxide, such as $Al_2O_3$, $Cr_2O_3$, $ZrO_2$, etc. is coated on the surface of the partition walls so as to improve heat resistance, oxidation resistance, and corrosion resistance of the sintered body. The method for coating the heat-resistant metal oxide can be any of the following methods wherein:

(1) the sintered body of the metal honeycomb structure is subject to the heat-treatment in an oxidizing atmosphere at a temperature ranging from 700° C. to 1100° C.;

(2) a metal such as aluminum, chromium, etc. is electroplated on the partition walls of the sintered body, and then the sintered body is subject to the heat-treatment in an oxidizing atmosphere at a temperature ranging from 700° C. to 1100° C.;

(3) the sintered body is immersed into a molten metal, such as molten aluminum, and then the sintered body is subject to the heat-treatment in an oxidizing atmosphere at a temperature ranging from 700° C. to 1100° C.;

(4) a sol including a suitable metal, such as aluminum, is coated on the surface of the partition walls of the sintered body and the sintered body is then subjected to the heat-treatment in an oxidizing atmosphere at a temperature ranging from 700° C. to 1100° C.;

Preferably the heat treatment is conducted at a temperature ranging from 900° C. to 1100° C.

Preferably at least one slit for regulating heat generation is formed through the partition walls. A slit of any length may be formed in any direction at any position.

Means for applying electric current to the honeycomb structure, such as electrodes, are provided on the outer periphery or inside of the metal honeycomb structure by means of brazing or welding so that electrodes are in electrical contact with the honeycomb structure.

The honeycomb heater thus obtained having the honeycomb structure and the electrodes may have an electrical resistance ranging from 0.001 to 0.5 ohm.

A catalyst composition including a catalytically active component for decomposing pollutants in an exhaust gas may be formed on the partition walls of the honeycomb structure so that purification reactions of pollutants may generate additional heat.

The catalyst composition includes a heat-resistant carrier having a large surface area and a catalytically active component loaded onto the heat-resistant carrier. The carrier is preferably inorganic oxide, and examples of the carriers include $\gamma$-$Al_2O_3$, $TiO_2$, a composite of $SiO_2$-$Al_2O_3$, and lanthanum cobalt having a perovskite structure.

The catalytically active component includes a noble metal such as platinum, palladium, rhodium, and iridium, and a base metal such as copper, chromium, and cobalt. The catalyst composition may be composed of $\gamma$-$Al_2O_3$ as the carrier, and 10 to 100 gram per square feet of platinum or rhodium loaded onto the carrier.

The honeycomb structure used in the present invention may or may not be porous and may have any porosity. However, to achieve sufficient mechanical strength, oxidation resistance, and corrosion resistance, the porosity of the metal honeycomb structure may be up to 50% by volume, and further preferably up to 25% by volume. In a honeycomb structure designed to load a catalyst composition, the porosity is at least 5% by volume thereby ensuring adhesion strength between the honeycomb structure and the catalyst composition.

EXAMPLE 1

(Honeycomb Heater A)

Iron powder, Fe—Al powder(Al:50 weight %), and Fe—Cr powder(Cr: 50 weight %), having average particle sizes of 10, 20, and 22 $\mu$m, respectively, were mixed to prepare a mixture having a composition of Fe—22Cr—5Al (percents by weight). The mixture was blended into methyl cellulose as an organic binder, oleic acid as an antioxidant, and water to produce a readily formable body. The body was extruded through an extrusion die to form into a green compact of a honeycomb structure. The green compact was dried and fired under a hydrogen atmosphere at 1350° C. The fired honeycomb structure was subjected to the heat-treatment at 1000° C. The honeycomb structure had a cylindrical shape having an outer diameter of 92 mm and a thickness along the axial direction of 38 mm. The honeycomb structure had a cell shape of square, as shown in FIG. 2, a thickness of partition walls of 4 mil, which is equivalent to 0.1 mm, and a cell density of 500 cells per square inch. The honeycomb structure had a porosity of 22% by volume and an average pore diameter of 5 m.

As shown in FIG. 1, 11 parallel slits were formed through the partition walls along the axial direction of the honeycomb structure. Six square cells were present between two adjacent slits. In outer peripheral portion in the radial direction in each slit, an alumina plate and an adhesive including silica and alumina were filled so that partition walls separated by the slit do not contact themselves, thereby ensuring electrical insulation through the slit.

Partition walls of the honeycomb structure were coated with alumina sol, and heated at a temperature ranging from 700° to 1100° C. in an oxidizing atmosphere to form a layer of $\gamma$-$Al_2O_3$ onto the partition walls. The honeycomb structure was immersed in a solution of platinum nitrate and rhodium nitrate, and then fired at 600° C. in air to load both platinum and rhodium onto the honeycomb structure in a combined amount of 40 grams per cubic feet.

As shown in FIG. 1, two electrodes were provided on the opposite side of the periphery of the honeycomb structure.

A metallic band covered the periphery and annular edges of the two ends of the honeycomb structure so that fluid can pass through the central portions therethrough, as disclosed in U.S. Pat. No. 5,202,548. A ceramic mat was provided between the metallic band and the honeycomb structure. The honeycomb structure had a diameter for passing fluid therethrough of 82 mm.

EXAMPLE 2

In Example 2 honeycomb heater B was made which is the same as honeycomb heater A of Example 1, including the material, the size, and the method of making the honeycomb heater, except that the honeycomb heater B had a cell shape of regular hexagon as shown in FIG. 4, a thickness of partition walls of 6 mil, which is equivalent to 0.15 mm, and a cell density of 430 cells per square inch.

EXAMPLE 3

In Example 3 honeycomb heater C was made which is the same as honeycomb heater A of Example 1, including the material, the size, and the method of making the honeycomb heater, except that the honeycomb heater C had a cell shape of rectangle in the pattern shown in FIG. 5, a thickness of partition walls of 0.14 mm, and a cell density of 460 cells per square inch.

EXAMPLES 4, 5, and 6

In Examples 4, 5, and 6 honeycomb heaters D, E, and F, respectively, were made which are the same as honeycomb heater A of Example 1, including the material, the shape, thickness, and pattern of partition walls of FIG. 2, and the method of making the honeycomb heater, except that the honeycomb heaters D, E, and F had honeycomb structures having a thickness along the axial direction of 50 mm, 25 mm, and 19 mm, respectively, instead of 38 mm of Example 1.

EXAMPLE 7

Figure 3:
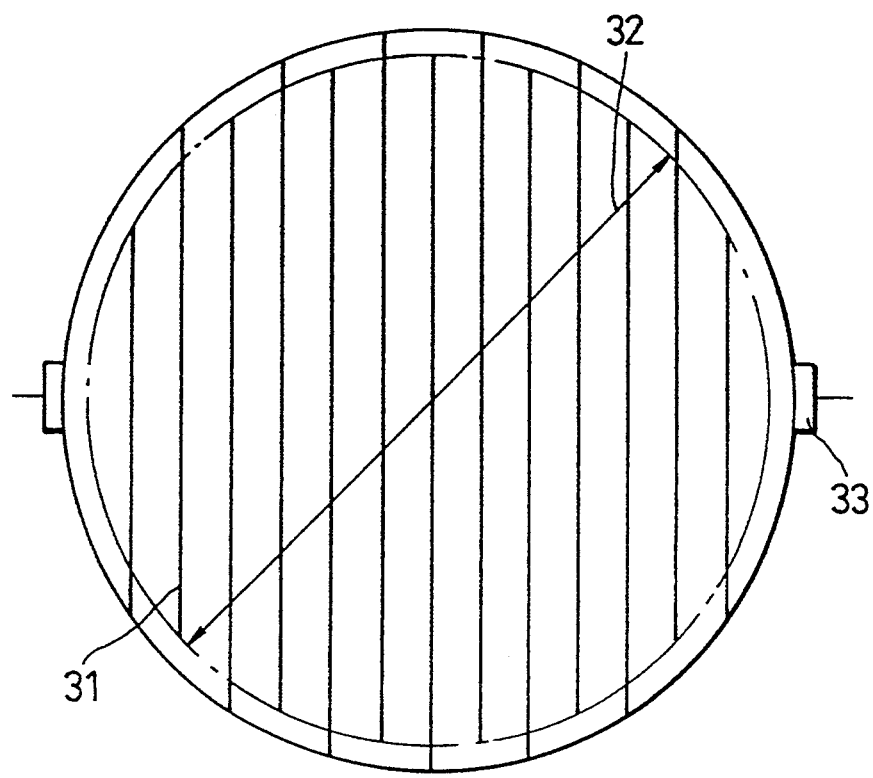
FIG. 3 shows a cross-sectional view of an embodiment of a honeycomb heater of the invention having a diameter for passing fluid therethrough of 110 mm.

In Example 7 honeycomb heater G was made which is the same as honeycomb heater A of Example 1, including the material, the shape, thickness, and pattern of partition walls of FIG. 2, and the method of making the honeycomb heater, except that the honeycomb heater G had a different size of the honeycomb structure. As shown in FIG. 3 the honeycomb structure of Example 7 had a diameter for passing fluid therethrough of 110 mm and a thickness along the axial direction of 21 mm, and 13 parallel slits were formed through the partition walls along the axial direction of the honeycomb structure.

The honeycomb structure of the honeycomb heater G had the same effective volume for passing fluid therethrough as the honeycomb heater A had.

(Thermal Shock Resistance Test of Honeycomb Heater)

Each of the honeycomb heaters of Examples 1–7 underwent a test for evaluating its thermal shock resistance. A honeycomb heater was arranged in the exhaust system of a two-liter engine. The engine was operated for 55 seconds continuously with normal fuel supply, and the engine did not receive any fuel for the next five seconds. This cycle composed of one minute was repeated 5,000 times. While the engine drove for the period of the 55 seconds, an average temperature of the exhaust gas passing through the honeycomb heater was about 850° C. While the engine ran due to inertia during the period of five seconds, the engine inhales only air so that an average temperature of the exhaust gas passing through the honeycomb heater dropped to about 600° C. Therefore, during this test, the honeycomb heater underwent temperature cycles between 850° C. and 600° C. 5,000 times.

The increase of electrical resistance of each honeycomb heater in percent after the test compared to the initial electrical resistance before the test is shown in Table 1 along with other characteristic of the honeycomb heater including a shape of passages or cells, a thickness of partition walls in mm, a cell density or a number of the passages per square inch, a gas passing diameter which refers to an effective diameter for passing fluid therethrough, a thickness of the honeycomb structure along the axial direction, a gas passing volume which refers to an effective volume for passing fluid through the honeycomb structure, a maximum length of linear portions along partition walls taken perpendicular to the axial direction, a ratio of an area of an end of the honeycomb structure in square centimeters to the thickness of the honeycomb structure along the axial direction, and an initial electric resistance of the honeycomb heater in milliohms.

Every honeycomb heater increased its electrical resistance after the test because thermal stress during the test caused small cracks in partition walls of the honeycomb structure thereby increasing an electric current path passing through the honeycomb structure between the two electrodes, However, the increase of the honeycomb heater B and the honeycomb heater C of the present invention is less than the increase of the honeycomb heaters A and the honeycomb heater G which are outside of the present invention.

It is obvious to a person skilled in the art that the different embodiments of the invention may vary within the scope of the claims presented below. The invention in its broader aspects is therefore not limited to the specific examples shown and described. Accordingly, departures may be made from the details shown in the example without departing from the spirit or scope of the disclosed general inventive concept.

(TABLE 1)

| Honeycomb heater | cell (passage) shape | thickness of walls (mm) | density (/in²) | gas passing diameter (mm) | thcknss. of the strctur. (mm) | gas passing volume (l) | maximum length of linear portions (mm) | ratio of area to thickns. (cm) | initial elec. resistance (mΩ) | increase in elec. resistance (%) |
|---|---|---|---|---|---|---|---|---|---|---|
| A | square | 0.10 | 500 | 82 | 38 | 0.20 | 82 | 14 | 35.9 | 7.9 |
| B | hexagon | 0.15 | 430 | 82 | 38 | 0.20 | 0.76 | 14 | 34.4 | 1.9 |
| C | rectangle | 0.14 | 460 | 82 | 38 | 0.20 | 1.78 | 14 | 37.8 | 2.6 |
| D | square | 0.10 | 500 | 82 | 50 | 0.26 | 82 | 21 | 27.6 | 9.3 |
| E | square | 0.10 | 500 | 82 | 25 | 0.13 | 82 | 21 | 54.7 | 5.3 |
| F | square | 0.10 | 500 | 82 | 19 | 0.10 | 82 | 27 | 71.5 | 3.8 |
| G | square | 0.10 | 500 | 110 | 21 | 0.20 | 110 | 45 | 118.0 | 24.0 |

What is claimed is:

1. A heating element for heating fluid flowing therethrough, comprising:

a honeycomb structure having a periphery and two ends, including a plurality of passages which are defined by partition walls and extend in an axial direction between the ends, said honeycomb structure being composed of an electrically conductive material; and means for applying electric current to said honeycomb structure so as to generate heat;

wherein a maximum length of linear portions of the partition walls is not greater than 10 mm in a cross-section of said honeycomb structure taken perpendicular to said axial direction, and a number of said passages in one square inch ranges from 50 to 800 in said cross-section of said honeycomb structure.

2. A heating element of claim 1, wherein said maximum length is not greater than 5 mm.

3. A heating element of claim 1, wherein said number of said passages in one square inch ranges from 50 to 500.

4. A heating element of claim 1, wherein a ratio of an area of one of said two ends in square centimeters to an average thickness of said honeycomb structure along said axial direction in centimeters ranges from 10 to 50 cm$^2$/cm.

5. A heating element of claim 1, wherein said ratio ranges from 10 to 30 cm$^2$/cm.

6. A heating element of claim 1, wherein at least one slit is formed through said partition walls.

7. A heating element of claim 1, wherein said partition walls have a thickness in the range of 40 to 250 $\mu$m.

8. A heating element of claim 1, wherein said passages have a length ranging from 10 to 50 mm along said axial direction.

9. A heating element of claim 1, wherein said honeycomb structure is an integral body formed by sintering a shaped body comprising a powder material.

10. A heating element of claim 1, further comprising a catalyst composition formed on at least a part of said partition walls of said honeycomb structure, said catalyst composition comprising a heat-resistant inorganic oxide and a catalytically active component loaded onto said inorganic oxide, said catalytically active component comprising an element selected from the group consisting of platinum, palladium, rhodium, and iridium.

11. A heating element of claim 1, wherein said means for providing electric current comprises two electrodes in electrical contact with said honeycomb structure.

12. A heating element of claim 1, wherein gaps are formed through said partition walls so as to shorten said maximum length of linear portions of said partition walls.

* * * * *